United States Patent [19]

Meldon

[11] Patent Number: 4,533,447
[45] Date of Patent: Aug. 6, 1985

[54] APPARATUS FOR AND METHOD OF ISOELECTRIC FOCUSSING

[76] Inventor: Jerry H. Meldon, 4 Greenway Ct., Apt. 3, Brookline, Mass. 02146

[21] Appl. No.: 503,916

[22] Filed: Jun. 13, 1983

[51] Int. Cl.³ .................. B01D 17/06; G01N 27/26; G01N 27/28
[52] U.S. Cl. .................. 204/181.4; 204/186; 204/301; 204/302; 204/299 R; 210/905
[58] Field of Search ............. 204/180 R, 180 P, 186, 204/DIG. 3, DIG. 4, 299 R, 301, 302; 210/905

[56] References Cited

U.S. PATENT DOCUMENTS

| | | | |
|---|---|---|---|
| 3,915,839 | 10/1975 | Rilbe et al. | 204/180 R |
| 4,204,929 | 5/1980 | Bier | 204/180 R |
| 4,362,612 | 12/1982 | Bier | 204/180 P |
| 4,401,538 | 8/1983 | Hausfeld | 204/180 P |

OTHER PUBLICATIONS

Meldon, J. H., et al, "The Mechanism of Carbon Dioxide Transport in Protein Solutions", Paper Presented at the Annual Convention of the American Institute of Chemical Engineers, Nov. 1982.
Meldon, J. H., et al, "Electrical Potentials Induced by $CO_2$ Gradients in Protein Solutions and Their Role in $CO_2$ Transport", *Bioelectrochemistry and Bioenergetics*, vol. 5, No. 1, 1978, p. 77–87.

*Primary Examiner*—John F. Niebling
*Assistant Examiner*—B. J. Boggs, Jr.
*Attorney, Agent, or Firm*—Sprung Horn Kramer & Woods

[57] ABSTRACT

An apparatus for and a method for separating a mixture of proteins containing proteins of different isoelectric points, which method comprises flowing an aqueous feed stream containing the mixture of proteins along a thin-channel flow path established between first and second gas-permeable membranes, diffusing a gas through the first and second membranes and generally transversely across the flow path of the feed stream, the gas selected to establish a gradient in the concentration of the gas and to provide a gradient in pH across the flow path of the feed stream, and, after a defined time period, separating the feed stream into streams containing concentrated fractions of proteins having defined isoelectric points, by virtue of the difference in the direction of diffusion occurring of the proteins in the flow path.

29 Claims, 2 Drawing Figures

APPARATUS FOR AND METHOD OF ISOELECTRIC FOCUSSING

REFERENCE TO PUBLICATION

The analysis of steady-state transport of carbon dioxide in thin films of a protein solution was made and reported in "The Mechanism of Carbon Dioxide Transport in Protein Solution", paper 96d, at the Annual Convention of the American Institute of Chemical Engineers, Los Angeles, Calif., Nov. 14–19, 1982, hereby incorporated by reference. The bicarbonate formulation of carbon-dioxide transport was calculated to be small, but to be significant in solutions of hemoglobin, in agreement with literature data. Facilitation is shown to be minimized by diffusion potentials, the magnitudes of which also agree with reported measurements. It is shown how potential gradients engender uneven distributions of the proteins within the liquid films. The effect, analogous to isoelectric focusing, is most striking in cases of secondary, highly charged proteins which are much less concentrated than the primary protein mediating $CO_2$ transfer.

BACKGROUND OF THE INVENTION

Where materials, such as biological materials like proteins, have an isoelectric point, the materials can be separated by isoelectric focusing, wherein a solution is passed through an electric-potential field and the materials in the solution are allowed to gravitate toward the isoelectric point of the material in the field.

For example, when an electrical field is imposed upon a solution containing a mixture of proteins, the positively charged proteins migrate towards one electrode (the cathode) and the negatively charged proteins migrate in the opposite direction towards the other electrode (the anode). The characteristic charge of a particular protein, Z, is the net result of the hydrogen ion association/dissociation equilibria of the protein's numerous titratable groups; for example, $-NH_3^+ = -NH_2 + H^+$ and $-COOH = -COO^- + H^+$. Hence, Z is a function of pH, proteins are amphoteric and there is a characteristic pH value for each protein, pI, known as its isoelectric point, at which $Z=0$. Thus, if in addition to an electric field there is a gradient in the solution's pH, each protein can be made to migrate to a location between two electrodes at which the prevailing pH corresponds to that protein's pI. The vanishing of the protein's net charge at that point causes that particular protein species to cease migrating.

In conventional isoelectric focusing technology, the necessary pH gradient is created by adding to the protein solution a concentrated mixture of relatively low molecular weight buffers known as ampholytes, the pI values of which span the range of the proteins to be separated. The solution is contained between two electrodes, for example, some 10 cm apart. Electrolysis of water caused by the applied voltage generates a pH gradient which is stabilized by the relatively rapid isoelectric focusing of the ampholytes. This is followed in turn by the isoelectric focusing of the slower moving proteins, the concentrations of which are sufficiently lower than those of the ampholytes as not to perturb radically the pH gradient. This methodology has been applied both as an analytical tool; for example, in order to determine a particular proteins's pI value, and as a means of separation, leading, with further treatment, to the isolation of purified proteins.

Because of the low mobility of proteins, typically electrical fields of 100 to 1000 volts/cm are employed, and, even so, long time periods of one or more days are often required, in order to accomplish desired degrees of separation. Usually, cooling must be provided to offset appreciable resistive heat whcih might otherwise denature the proteins. Oxygen generated at the anode also may cause denaturation. An inherent disadvantage of the conventional methodology is the contamination of the proteins by the ampholytes used in the process.

Therefore, it is desirable to provide a new and improved method for the detection and/or separation of biological and other materials by isoelectric-focusing techniques, which overcome some of the disadvantages of the prior methods.

SUMMARY OF THE INVENTION

The invention relates to an apparatus for and a method of detecting and/or separating a mixture of materials having a difference in isoelectric points. In particular, the invention concerns an apparatus for and a method of concentrating particular proteinaceous material from a protein solution.

It has been discovered that a feed stream, composed of a mixture of materials, such as an aqueous stream composed of a mixture of proteinaceous materials having different isoelectric points, may be separated into one or more concentrated streams containing the materials or proteins of defined isoelectric points, either for the purposes of detection or for separation. The method and apparatus of the invention avoid the difficulties associated with prior-art techniques for the detection and separation of proteins, such as the avoidance of electrical fields of high voltage, the denaturing of the proteins, the contamination of the proteins with ampholytes and other disadvantages associated with prior-art isoelectric-focusing and protein-separation techniques. The method of the invention comprises establishing a gradient in the concentration of a particular gas stream generally transversely across the path of flow of the feed stream to be separated, the gas stream selected to provide, with the feed stream, a gradient in pH conditions extending transversely across the flow path, and, thereafter, separating the material of different isoelectric points, as the different isoelectric material moves through the gradient in different directions into a concentrated stream of defined isoelectrical material, thereby providing a method for the separation and/or detection of the material so isolated in the gradient field.

Typically, an aqueous solution containing a mixture of proteinaceous material having different isoelectric points is flowed through a defined flow path, such as a thin-film or other narrow flow channel. The flow path of the aqueous solution is defined between a pair of gas-permeable-type materials, and a gas stream composed of an acid or alkaline gas is disposed transversely to the direction of the flow path, by passing the gas stream through the membranes from one to the other side, typically with the use of an inert sweep gas on the opposing side, to establish a gradient in the concentration of the acid or alkaline gas across the flow path of the aqueous solution, as well as an electric potential gradient, and causes, by virtue of the directional diffusion of the different isoelectric-point material in the aqueous solution, the separation of the protein material, by virtue of such difference in pH and electrical potential across the flow path.

Thus, the protein separation is based upon the difference in the diffusion direction of the proteins toward their isoelectric points in the aqueous solution; that is, the pH values at which particular proteins carry a net zero electrical charge. Where the pH in the solution is equal to the pI of a given protein, then that protein will not migrate further under the influence of an electrical field. In the method, if a mixture of proteins in an aqueous solution is contained in a flow path in which the pH varies continuously in a particular direction transverse to the flow, an electrical field arises as a diffusion potential or is externally imposed in the same direction, and the proteins will accumulate in the regions where the prevailing pH approaches their respective pI values.

In the method of and apparatus of the invention, a gaseous concentration gradient across the flow path causes, typically by virtue of the chemical reaction of the gas with a solvent liquid carrier of the protein solution, a parallel gradient in the concentration of the reaction product for the gas solvent and an antiparallel gradient in pH. The gradient in concentration of reaction product causes that ionic species to diffuse across the flow path. The gradient in pH established across the flow path causes gradients in the concentrations of the charged protein species and, hence, their diffusion across the flow path. A diffusion potential arises because of the difference in the mobilities of reaction product and protein species. Where the pH in the flow path is equal to a particular protein's pI value, that protein's electrically driven migration is halted at that transverse position in the flow path.

In the method of the invention, the proteins are subjected to a gas concentration gradient established by the gas diffusion across the flow path; thus generating electrical and concentration driving forces for their migration. A condition is approached in which the two driving forces balance one another, and an effective permanent degree of separation is obtained for the mixture of proteins into two fractions, each of which fractions has a defined isoelectric point. The basis of separation of the proteins in the invention is based on the direction in which the various proteins diffuse in the flow path, which diffusion direction depends upon the positive or negative charge of the protein and, hence, the particular isoelectric point relative to the prevailing pH in the flow stream, which distinguishes the protein and dictates into which fraction the protein will diffuse.

The feed stream to be separated typically comprises an aqueous solution or colloidal suspension of proteinaceous materials, the materials having a different isoelectric point. Such proteinaceous materials may comprise, but not be limited to, for example, enzymes, hormones, antibodies, amino acids, nucleic acids, albumin and hemoglobin, and other simple and complex proteins and other biological and biochemical materials.

The particular selection of the gas employed to diffuse or to be passed into the flow path of the proteinaceous feed stream may vary, but typically comprises an acid or alkaline gas stream, which, on reaction with the solvent of the liquid carrier stream, such as the water, provides for the establishment of a pH gradient. The gases employed may, for example, be the acid anhydrides involving sulfur, carbon and nitrogen, such as, for example, sulfur dioxide and carbon dioxide, or their actual acids and bases, such as, for example, hydrogen sulfide and ammonia. The selected gases are employed to diffuse or otherwise to pass through and transversely across the flow path of the feed stream. Diffusion generally is established between two gas-permeable materials, and often includes an inert sweep gas employed on the one opposing side, so as to remove the diffused gas from the opposing side of the gas-permeable material, after passing across the solution flow path. A wide variety of inert sweep gases may be employed, which would include, but not be limited to, nitrogen, helium, argon, hydrogen and other inert gases which would not affect the establishment of the pH gradient, nor substantially react with the particular gas stream used for diffusion or the solution.

Typically, the flow path, through which the proteinaceous feed stream is introduced, includes a gas-permeable membrane-type material which permits the introduction of the gas across the flow path of the feed stream. Such gas-permeable material may include various materials in various shapes, such as fibers, tubes and thin films, both supported and unsupported, typically spaced apart, to delimit a defined, narrow flow path, and may comprise, for example, gas-permeable cellulose acetate or cellulose triacetate-type membranes, as well as other polymeric membranes which may be gas-porous in nature or otherwise formed or treated, to permit the rapid diffusion of the selection gas therethrough and into the feed stream on the opposite side of the membrane. Such membranes would include, for example, a product known as Celgard, a polyolefin-type resin containing a plurality of micropores therein and being hydrophobic in nature, permitting the passage of gas from one side of the Celgard material, through the material and to the opposite side, wherein the feed stream is contained. The membrane material may be a silicone-type, gas-permable membrane; however, any membrane material selected must be compatible with the proteins, so that the surface of the membrane does not substantially denature the protein.

If desired, the direction of diffusion and the diffusion rate may be enhanced further by the employment of various catalysts; for example, on the inner surface of the gas-permeable membrane, such as by immobilizing the particular catalyst on the surface thereof, to catalyze the gas reaction with feed stream solution, or by the employment of spaced-apart electrodes to enhance the potential difference across the flow path of the solution. The porous electrodes of opposite polarity may be placed between the flowing solution and the gas-permeable membrane. The degrees of purification of the recovered products and the degree of separation may be enhanced further by using multiple channels and a combination of a catalyst, multiple channels and electrodes.

The invention will be described for the purpose of illustration only in connection with a particular embodiment; however, it is recognized that those persons skilled in the art may make various changes and modifications to the described embodiment, all falling within the spirit and scope of the invention.

BRIEF DESCRIPTION OF THE DRAWING

FIG. 1 is a schematic perspective view of an apparatus for the separation of a protein mixture in accordance with the invention and FIG. 2 is a schematic view of a multichannel apparatus in accordance with the invention.

DESCRIPTION OF THE EMBODIMENTS

Figure 1:
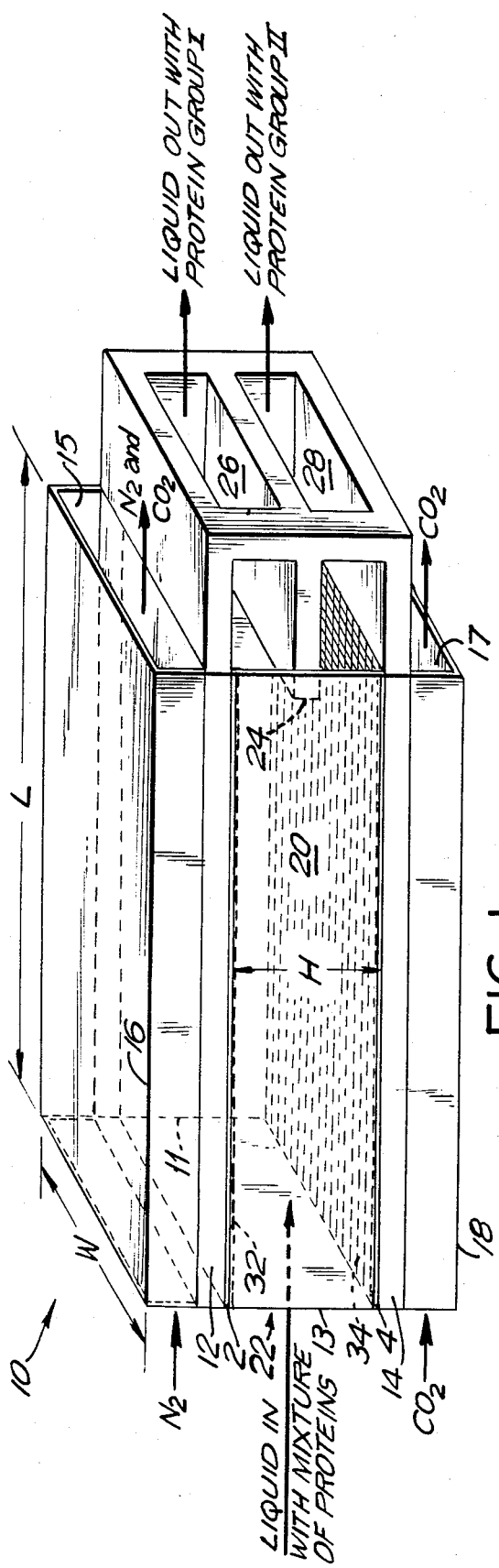

FIG. 1 is a schematic illustration of an apparatus for the separation of an aqueous protein solution, which apparatus 10 comprises a pair of spaced-apart, supported gas permeable membranes 2 and 4, typically cellulose acetate gas membranes permeable to carbon dioxide, which are stretched over porous plastic supports 12 and 14 to define with side walls 11 and 13 a small, thin flow channel 20 of height H. The apparatus 10 has a length L and a wide W and includes C-shaped channel forming members 16 and 18 on either side of the respective membrane supports 12 and 14, to define a channel 17 for the introduction, on one side of the gas-permeable membrane 4, of a carbon-dioxide gas at one end and the withdrawal of carbon-dioxide gas from the other end; and to define a channel 15 on one side of membrane 2, for the introduction of an inert nitrogen sweep gas into the inlet thereof and the withdrawal of the nitrogen gas together with diffused carbon-dioxide gas from the outlet, the carbon dioxide being that carbon-dioxide gas which is diffused from membrane 4 across the flow path 20 and through the gas-permeable membrane 2, to admix with the nitrogen sweep gas. The spaced-apart gas-permable membranes, which membranes need not be the same membranes, define a thin inlet 22 into the thin flow channel 20 at the one end, and, at the other end of the apparatus, there is defined a physical divider 24 projecting into the flow path 20, which is adapted to divide the protein mixture separated into a protein group I and a protein group II of defined isoelectric points. The protein effluent streams I and II are withdrawn through outlets 26 and 28 at the one end of the apparatus 10.

In operation, a pure carbon-dioxide-containing gas stream is introduced into the gas channel 17 between the member 18 and the one surface of gas-permeable membrane 4 at one end of the apparatus 10 and withdrawn from the other end, while an aqueous solution, containing, for example, a mixture of proteins, such as albumin (having a pI of 4.5 to 5.0) and hemoglobin (having a pI of 6.5 to 7.0), is introduced into the inlet 22 of the flow path 20 to pass from the one to the other end of the apparatus. A pure nitrogen inert sweep gas is introduced into the gas flow channel 15 between the member 16 and the other surface of the gas-permeable membrane 2, which membrane is permeable to the carbon dioxide. The carbon dioxide passes through the gas-permeable membrane 4 and into and transversely across the thin flow channel 20 of the protein mixture, to establish a gradient in the concentration of carbon dioxide transverse to the direction of flow. The carbon dioxide passing through the flow channel 20 passes through gas-permeable membrane 2 and is removed with the nitrogen sweep gas. The aqueous solution of protein, prior to leaving the apparatus 10, will have migrated into two groups, one group that has accumulated in that half of the flowing solution close to the carbon dioxide stream of greater carbon dioxide concentration, and the other group in the other half of the stream closer to the sweep gas.

A $CO_2$ gradient caused by the $CO_2$ diffusion across the flow path provides, by virtue of the chemical reactions $CO_2 + H_2O = H_2CO_3 = HCO_3^- + H^+$, a parallel gradient in the concentration of bicarbonate ion, $HCO_3^-$, and an antiparallel gradient in pH. The bicarbonate gradient causes that species to diffuse from the $CO_2$ to the $N_2$ membrane side of the protein solution. The gradient in pH causes gradients in the concentrations of charged protein species and, hence, their diffusion.

Since the $HCO_3^-$ ion is much more mobile than proteins, the diffusion process perturbs the electrical charge balance throughout the solution, which brings about what is known as a diffusion potential. A relatively negative potential prevails on the $N_2$ side of the solution. All charged species migrate under the influence of this potential, but where the pH is equal to a particular protein's pI value, that protein's electrically driven directional migration is halted. After a certain period of time (depending in part on the channel thickness (H)), the proteins in the solution will have distributed themselves, such that the electrical and concentration driving forces for their migration transverse to the direction of flow balance one another, and an effectively permanent degree of separation is attained at the other end of the apparatus.

For example, when a protein solution containing albumin (pI 4.5 to 5.0) and hemoglobin (pI 6.5 to 7.0) is placed in the apparatus 10, the solution pH will approach albumin's pI near the $CO_2$ stream and hemoglobin's pI near the $N_2$ stream. In the bulk of solution, albumin will carry a negative charge and hemoglobin a positive charge, causing the albumin to accumulate near the $CO_2$ stream as protein group II and hemoglobin near the $N_2$ stream as protein group I. The electrical potential difference across the solution will approach 0.1 to 1.0 volt.

The apparatus flow path H is made narrow, in order to minimize the time required for diffusion of the various protein species transverse to the direction of flow of the solution. The time for diffusion of a particular protein species is proportional to the square root of its molecular weight, as well as the square of the distance traveled, and inversely proportional to the voltage difference. The dimensions L and W of the apparatus are so selected, so that, with a given flow rate, the desired degree of protein separation is achieved before the liquid exits the apparatus 10. In the example cited, with H=2 mm, W=5 cm and L=50 cm, a flow of 10 to 100 ml/hr can be processed into streams of essentially pure hemoglobin (I) and albumin (II) solutions.

Larger quantities of solution may be separated by immobilizing the enzyme carbonic anhydrase on the inner surfaces of the $CO_2$-permeable membranes, thereby catalyzing the $CO_2$ hydration reaction and maximizing the bicarbonate, pH and electrical potential gradients.

Larger quantities may also be separated by boosting the potential difference with porous electrodes 32, 34 placed between the flowing solution and the gas-permeable membranes 2, 4 and connected to a regulated potential source (not shown). The greater electrical driving force speeds up the transverse diffusion process, reducing the time to achieve separation and, thereby, allowing greater liquid velocity and volumetric flow through the same channel.

Figure 2:
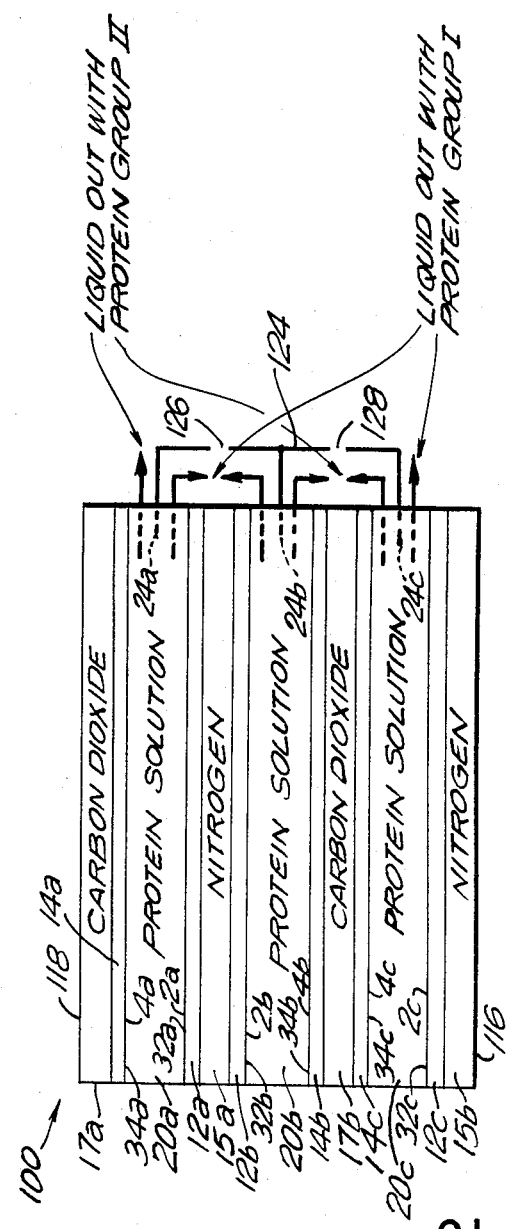

In a further embodiment shown in FIG. 2, larger quantities are separated by a multi-channel system. In the use of multiple-channel systems, the volumetric flow rate through a single channel is as before, but the increase in number of liquid channels allows handling of more volume. As shown the apparatus 100 has gas channels 17a, 17b for $CO_2$ and 15a, 15b for $N_2$. These channels are configured to have the gases enter and exit through side ports. Liquid channels 20a, 20b, 20c are provided and are configured to have liquid enter and exit through end ports. As in the embodiment of FIG. 1, gas channel 17a is formed from member 118 and porous membrane support 14a, gas channel 15b is formed from member 116 and porous membrane support 12c. The other channels are formed from the side walls of the apparatus 100 and porous membrane supports 14a, 14b, 14c and 12a, 12b, 12c. Also included therein are corresponding membranes 4a, 4b, 4c and 2a, 2b, 2c and electrodes 32a, 34a, 32b, 34b and 32c, 34c.

The divider 124 includes member 24a for dividing channel 20a, member 24b for dividing channel 20b and member 24c for dividing channel 20c. Divider 124 also includes outlets 126 and 128 for protein groups I and II respectively.

For refinements in the degrees of purification and separation of the proteins, additional stages, similar in design to that of FIGS. 1 and 2, may be added in series. Finally, with proteins of sufficiently high pI values, the solutions will be alkaline and then carbonate ion will play a role analogous to bicarbonate ion.

EXAMPLE

A representative application of the apparatus of FIG. 1 is used for the separation of the human blood proteins albumin (pI=4.8) and hemoglobin (pI=6.8) initially present in an aqueous solution at concentrations of 1 millimole/liter. No other electrolytes are present at signficant concentrations, operation is at room temperature and pressure, and 100 milliliters of feed solution are processed hourly.

The dimensions of the apparatus's liquid channel are chosen as follows:

(i) The height (H) influences strongly the magnitude of the electrical field (volts/cm) established between the gas channels which, in turn, determines the rates of protein migration into, respectively, albumin-rich and hemoglobin-rich portions. The height is chosen to be the narrowest possible without impairing the feasibility of splitting the exciting liquid stream into albumin-rich and hemoglobin-rich halves. Accordingly, the height is 2 mm.

(ii) A suitable combination of liquid channel length (L) and width (W) is one which provides a total liquid channel volume (LCV) that ensures essentially complete protein separation by the end of the liquid residence time (LRT). Note that $LCV = H \times W \times L$, and that $LRT = LCV/LFR$, where LRF, the liquid flowrate, is 100 ml/hr. The minimum LRT in this case is calculated to be approximately 1000 seconds on the basis of (a) a potential difference, V, of 0.2 volt established between the upper and lower boundaries of the liquid channel, as result of the electrostatic interactions between bicarbonate and more slowly moving protein ions;
(b) an average protein electrical charge of 5 equivalents/mole, negative for albumin and positive for hemoglobin;
(c) protein diffusivities, D, of $5 \times 10^{-7}$ cm$^2$/sec;
(d) the law of electrical migration yielding the velocity of migration:

$v = (zFD)/RT(V)/H$ where z is protein charge; F, Faraday's constant, is 96,500 coulombs/equivalent; R, the ideal gas constant, is 8.314 coulomb-volt/mole/°K; and T, the absolute temperature, is 295° K. This yields an electrical migration velocity of $10^{-4}$ cm/sec. Thus, the time for the proteins to travel an average distance of 0.1 cm is $0.1/10^{-4} = 1000$ seconds.

Given the liquid flowrate (LRF) of 100 ml/hr = 0.028 cm$^3$/sec, then the liquid channel volume ($LCV = L \times W \times H$) must be at least $1000 \times 0.028 = 28$ cm$^3$, and thus the product L×W must be at least 28/H = 140 cm$^2$. To minimize the effect of protein back-diffusion towards the liquid entrance (which would detract from product purity), L should well exceed W. W is set at 5 cm and L is set at 50 cm to satisfy this criterion while providing nearly twice the necessary residence time.

The gas flowrates are selected to maintain the necessary carbon dioxide gradient transverse to the liquid flow. Pure $CO_2$ and $N_2$ are fed to the respective lower and upper gas channels at slightly above atmospheric pressure. The electrical field is maintained high by minimizing the increase, along the flowpath, of the $CO_2$ concentration in the initially pure $N_2$ stream. The electrical field is rather less sensitive to the $N_2$ buildup in the initially pure $CO_2$ stream which, furthermore, is small because of the low $N_2$ solubility in the liquid stream.

An upper bound on the rate of $CO_2$ permeation through the liquid film can be estimated from the $CO_2$ permeability in pure water of approximately $1.5 \times 10^{-5}$ (cm$^3$ (STP)/(cm$^2$–sec–(atm/cm))), and the area, L×W, of 250 cm$^2$. With the $CO_2$ partial pressure gradient maintained close to 1 atm/0.2 cm = 5 atm/cm, the steady state $CO_2$ permeation rate will be no greather than 0.02 cm$^3$ (STP)/sec, or some 75 cm$^3$/hr. Thus, the $CO_2$ buildup in the $N_2$ stream will be no greater than 0.01% of the total flow, if the $N_2$ flow (which is effectively constant along the length of the apparatus) is 12.5 liters/min. Since $N_2$ permeation through the liquid will be some 25 times slower than that of $CO_2$, and the potential difference is comparatively insensitive to it, the $CO_2$ flow is 0.1 liter/min.

Since flow rate, pressure and purity are the only important aspects of the gas streams, convenience guides selection of gas channel dimensions. Their length and width are effectively constrained by the design to equal those of the liquid channel (50 cm and 5 cm, respectively). The height of the gas channel is also chosen, for simplicity, to equal that of the liquid channel, 2 mm.

The gas and liquid channels are separated from one another by, polypropylene membranes (sold commercially as "Celgard"), the micropores of which exclude liquid water but offer no resistance to gases (including water vapor, whose loss from the solution may be prevented by prehumidfying the feed gases). The membranes are stretched over porous plastic supports situated on the gas side.

What is claimed is:

1. A method of separating a feed stream composed of a mixture of materials having different isoelectric points, into one or more concentrated streams containing materials of defined isoelectric points, which method comprises:
   (a) establishing a concentration gradient of a gas stream across a path of flow of the feed streams, the gas stream selected to provide the feed stream with a pH gradient across the flow path of the feed stream; and
   (b) separating the materials having different isoelectric points into concentrated effluent streams of defined isoelectric points, such separation occurring by virtue of the dependence of the directions of diffusion of the different feed materials upon the isoelectric points of the feed materials which occurs in the gradient established across the path of flow.

2. The method of claim 1 wherein the feed stream comprises an aqueous stream containing proteinaceous materials of different isoelectric points.

3. The method of claim 2 wherein the feed stream comprises a mixture of hemoglobin an albumin.

4. The method of claim 2, wherein said proteinaceous material is selected from the group consisting of enzymes, hormones, antibodies, amino acids, nucleic acids, albumin and hemoglobin.

5. A method according to claim 1, wherein the pH values of the materials in the feed stream differ by about 2.

6. The method of claim 1 wherein the gas stream employed is a carbon-dioxide-containing gas stream.

7. The method of claim 1 wherein the gas establishes a difference in electrical potential across the flow path of the feed stream of about 0.1 to 1.0 volt.

8. A method according to claim 1, which includes providing electrodes across the flow path of the feed stream, to supplement the naturally evolving electrical potential and so accelerate further the rate of diffusion and separation of the feed stream into one or more concentrated isoelectric fractions.

9. The method of claim 1 which includes establishing a gradient by flowing a feed stream in a flow path between gas-permeable type materials, and passing gas through the gas-permeable type materials generally transversely to the path of the flow of the feed stream between the gas-permeable-type materials, to establish the gradient in the concentration of the gas stream.

10. The method of claim 9, wherein said gas-permeable-type materials are gas-permeable membranes.

11. The method of claim 10 which includes immobilizing a catalyst on an inner surface of the gas-permeable membrane.

12. The method of claim 11, wherein the catalyst is the enzyme carbonic anhydrase.

13. A method according to claim 9, wherein the gas-permeable type materials are gas-permeable membrane-type materials.

14. The method of claim 1 which includes
(a) flowing the feed stream through a narrow channel flow path established by a pair of spaced-apart, first and second gas-permeable membranes;
(b) passing a carbon-dioxide-containing gas stream adjacent to an outer surface of a first membrane and an inert sweep gas on an outer surface of a second membrane, to provide for a gradient in the concentration of the carbon dioxide-containing gas stream across the first and second membranes and the narrow channel flow path of the feed stream;
(c) withdrawing a carbon-dioxide-containing gas from the gas channel adjacent to the first membrane;
(d) withdrawing an inert gas containing carbon dioxide from the gas channel adjacent to the second membrane; and
(e) separating the feed stream across the narrow channel flow path, to recover concentrated streams containing desired materials of particular isoelectric points.

15. The method of claim 14 which includes physically dividing the feed stream into two or more concentrated feed streams, after an effective permanent degree of separation.

16. The method of claim 1 which includes providing a plurality of paths of flow of the feed stream, establishing a gradient across each path of flow and separating the material of different isoelectric points in each flow path.

17. The method of claim 1, wherein said gas stream is an acid or an alkaline gas stream.

18. The method of claim 1, wherein said gas stream comprises a gas selected from the group consisting of sulfur dioxide, carbon dioxide, hydrogen sulfide and ammonia.

19. A method according to claim 1, wherein said materials are biological materials.

20. A method of separating a feed stream comprising a mixture of proteins of different isoelectric points into one or more concentrated feed streams composed of proteins of defined isoelectric fractions, which method comprises:
(a) flowing an aqueous feed stream along a narrow channel flow path established between a first carbon dioxide-permeable membrane and a second carbon-dioxide-permeable membrane, each of said membranes having an inner surface facing said flow path and an outer surface facing a gas;
(b) flowing a carbon-dioxide-containing gas stream adjacent the outer surface of the first membrane;
(c) flowing an inert sweep gas adjacent the outer surface of the second membrane;
(d) diffusing and passing the carbon-dioxide-containing gas through the first carbon-dioxide-permeable membrane in a direction generally transversely to the narrow channel flow path of the feed stream and through the second carbon-dioxide-permeable membrane, to establish a concentration gradient in the dissolved carbon-dioxide gas stream across the narrow channel flow path of the feed stream, and to provide a pH gradient across the narrow channel flow path;
(e) withdrawing a mixture of the carbon-dioxide-containing-gas stream and the inert sweep gas stream from a location adjacent the second membrane; and
(f) recovering, after a period of time, concentrated feed streams composed of proteins of defined isoelectric fractions, by physically separating portions of the feed stream after the period of time.

21. An apparatus for the separation of a feed stream comprising a mixture of protein materials, said materials having different isoelectric points, into one or more concentrated streams composed of proteins of defined isoelectric points, which apparatus comprises:
(a) first and second gas-permeable membranes, the membranes each having an inner surface facing said feed stream and an outer surface facing a gas, the first and second membranes spaced apart to define a flow path for the feed stream between the inner surface of the first and second membranes;
(b) an inlet for the introduction of a feed stream into the flow path;
(c) a first gas channel disposed adjacent the outer surface of the first membrane;
(d) a second gas channel disposed adjacent the outer surface of the second membrane;
(e) an inlet for the introduction of a gas stream to the second gas channel;
(f) an inlet for the introduction of an inert sweep gas to the first gas channel;

(g) an outlet for the removal of the gas stream from the second gas channel;

(h) an outlet of the removal of a mixture of the inert sweep gas and gas stream from the first gas channel;

(i) an outlet in the flow path for the withdrawal of the concentrated streams composed of proteins of defined isoelectric points; and (j) means to physically divide the feeds stream at the outlet in the flow path into concentrated streams composed of proteins of defined isoelectric points.

22. The apparatus of the claim 21, wherein the means to physically divide the feed stream comprises a physical projection adjacent the outlet in the flfow path.

23. The apparatus of claim 21, wherein the first and second gas-permeable membranes are spaced apart, to define a narrow channel flow path having a distance of about 5 millimeters or less.

24. The apparatus of claim 21, which further comprises first and second electrodes spaced apart across the flow path, and means to establish an electrical potential gradient across the flow path.

25. The apparatus of claim 21, wherein the gas-permeable membrane comprises a carbon-dioxide, gas-permeable membrane.

26. The apparatus of claim 21, wherein said membranes comprise materials selected from the group consisting of cellulose acetate, polyolefin-type resin, silicone and cellulose triacetate.

27. The apparatus of claim 21, wherein the ratio of the distance between the membranes to the width of the flow path to the length of the flow path is 2:50:500.

28. The apparatus of claim 21, which includes a plurality of paths of flow defined by a plurality of sets of first and second membranes.

29. The apparatus of claim 21, wherein said membranes are stretched over porous supports.

* * * * *

UNITED STATES PATENT AND TRADEMARK OFFICE
CERTIFICATE OF CORRECTION

PATENT NO. : 4,533,447
DATED : August 6, 1985
INVENTOR(S) : Jerry H. Meldon

It is certified that error appears in the above-identified patent and that said Letters Patent is hereby corrected as shown below:

| | |
|---|---|
| Col. 1, line 46 and and Col. 2, line 65 | Delete "electric" and substitute --electrical-- |
| Col. 2, line 8 | Correct spelling of "which" |
| Col. 4, line 46 | Before "feed" insert --the-- |
| Col. 5, line 11 | Delete "wide" and substitute --width-- |
| Col. 5, line 25 | Correct spelling of "permeable" |
| Col. 7, line 39 | Delete "exciting" and substitute --exiting-- |
| Col. 8, line 3 | Delete "(LRF)" and substitute --(LFR)-- |
| Col. 8, line 30 | Delete "greather" and substitute --greater-- |
| Col. 8, line 62 | Delete "streams" and substitute --stream-- |
| Col. 11, line 15 | Delete "flfow" and substitute --flow-- |

Signed and Sealed this

Twenty-sixth Day of November 1985

[SEAL]

Attest:

DONALD J. QUIGG

Attesting Officer    Commissioner of Patents and Trademarks